United States Patent Office 3,761,291
Patented Sept. 25, 1973

3,761,291
PROCESS FOR PREPARING SYNTHETIC
AGGREGATE
Richard L. Ferm, Lafayette, Calif., assignor to Chevron
Research Company, San Francisco, Calif.
No Drawing. Filed Sept. 21, 1970, Ser. No. 74,229
Int. Cl. C08h 13/00, 17/02; C08j 1/46
U.S. Cl. 106—280    11 Claims

ABSTRACT OF THE DISCLOSURE

A synthetic aggregate is provided by (1) combining asphalt either as an emulsion or in cutback form with a silty-clay soil in a ratio of from 0.02 to 0.7 parts asphalt to 1 part of silty-clay soil, (2) thoroughly mixing the constituents, and (3) forming high compressive strength water-resistant aggregate particles of from one-quarter inch to one inch by baking at a temperature of from 250 to 600° F.

BACKGROUND OF THE INVENTION

Field of the invention

There is a continuing need in many parts of the world to stabilize heavy clay soils for use as roads, airfields, construction sites, and the like, in areas where natural aggregates are in short supply. The Mekong Delta region in Vietnam and certain areas of Brazil are illustrations of the type of area where natural aggregates are in short supply and must be transported long distances at great expense.

Numerous attempts have been made to stabilize clay soils in situ to provide a stable base with varying degrees of success. However, aggregate such as crushed rock continues to be a more favorable solution to stabilization of clay soils if it is available. The need or utility then for a synthetic aggregate which could be prepared from the clay soils which are often available and require stabilization in areas where aggregates such as crushed rock, limestone and the like are not available is obvious.

Description of the prior art

U.S. Pat. 3,287,146 describes a process for constructing building blocks by combining asphalts with soil followed by pressure-forming and heating.

U.S. Pat. 3,281,256 teaches a process for manufacturing hard asphalt-soil compositions by combining asphalt with soil, prehardening by heating, compressing the mixture and then baking.

SUMMARY

A process is provided for the preparation of synthetic aggregate from clay soil by prewetting the clay soil with water, combining the prewetted clay soil with asphalt in the form of a cutback or emulsion with mixing followed by a tumbling treatment to form spherically-shaped particles in aggregate form. The spherically-shaped particles are then baked at a temperature of from 250° to 600° F. to drive off volatiles and form strong bonds between the asphalt and the clay soil particles.

Alternatively, the clay soil, either with or without prewetting, can be mixed with the asphalt in either cutback or emulsion form, the mixture compressed to form a compacted cohesive sheet, baked to drive off volatiles and to crack the compacted sheet followed by any required comminution into smaller aggregate size particles to form water-resistant aggregate particles of considerable strength.

DESCRIPTION OF THE INVENTION

The process of the present invention is directed to a method for forming synthetic aggregate from clay soils by combining asphalt with the clay soil, followed by a baking step to form strong asphalt-clay soil particle bonds.

The asphalt may be added in one of two forms:

(1) As a cutback asphalt, or
(2) As an asphalt emulsion

After thorough mixing of the clay soil and the asphalt, two alternative processes may be used to form the synthetic aggregate. The mixture may be spread in a layer, compressed to form a compacted cohesive sheet of from about one-quarter inch to about one inch, baked to drive off the volatile constituents, thereby resulting in cracking of the compacted sheet, followed by comminution into smaller aggregate size particles by a rolling operation, tumbling operation or the like.

When utilizing this process, the addition of prewetting water to the clay soil prior to the blending of the asphalt with the clay soil is optional when a cutback asphalt is being utilized. However, the process can be successfully carried out with the cutback asphalt when the clay soil contains up to about 10 percent water. When using an asphalt emulsion, the clay soil is preferably prewet with water enabling better contact between the clay soil particles in the asphalt with consequent reduction in mixing time.

As an alternative process for preparing synthetic aggregate from clay soil, the clay soil, prewetting water and asphalt may be well-mixed and then tumbled in an operation which results in the formation of the aggregate particles in the form of small spheres of from about one-quarter inch to about one inch in diameter. These spherical aggregate particles are then cured by baking to drive off volatile materials and to form the strong asphalt-clay soil bonds required to have the water-resistance and high compressive strength required for successful utilization as synthetic aggregate. In this alternative process, the ratio of prewetting water to clay to asphalt in either cutback or emulsion form is critical to give the desired spherical particles. If too much water is present, the composition is sticky and a large unitary mass of material is formed. If too little water is present, the particles tend to be flaky and have little initial cohesive strength resulting in the breaking up of the particles before the desired size of particles is obtained.

PREWETTING

When an asphalt emulsion is used to form the synthetic aggregate, the silty-clay soil is preferably prewet with from about 5 percent to about 20 percent water based on the weight of the soil, preferably from about 10 percent to about 15 percent. Alternatively, the emulsion may be diluted to give from 10 to 30 percent residue based on the total weight of the diluted emulsion. A large quantity of the emulsion is then required to provide the desired amount of asphalt.

When a cutback asphalt is used in the tumbling operation method of preparing the aggregate, the quantity of prewet water used is from about 5 to about 10 percent by weight based on the weight of the soil.

ASPHALT EMULSIONS

Conventional asphalt emulsions having from 40–70 percent by weight, preferably from 50–65 percent, residue present can be utilized in this invention. They are preferably anionic in nature. A preferred asphalt emulsion is the emulsion formed using pinewood resin as the emulsifier.

CUTBACK ASPHALTS

The cutback asphalts used in this invention comprise asphalts thinned with relatively volatile solvents, such as naphtha, kerosenes, or other relatively volatile oils. Rapid curing cutbacks or a medium curing type may be empoyed. In the rapid curing cutbacks various naphthas are the ordinary solvent while in the medium curing type hydrocarbon oils in the kerosene boiling range are utilized.

ASPHALTS

Asphalts useful in this invention in both (1) the emulsion and (2) the cutback forms are conventional paving asphalts having penetrations ASTM in the range of from about 50–150 @ 77° F. and softening points of from about 90° to about 110° F. Examples of suitable types of asphalts are those derived from Californian, Venezuelan and Arabian crudes.

SILTY-CLAY SOILS

The type of silty-clay soils which can be ussed in the subject invention are those having a minimum of about 10 percent by weight silty-clay particles and preferably a minimum of 5 percent by weight clay particles present, and more preferably have from 30–50 percent by weight clay particles present. Clay is defined as mineral particles equal to or less than 6 microns in size. Silt is defined as mineral particles in the size range of from 6 to 75 microns. Among satisfactory soils are Walnut Creek soil, Turlock soil and Hans Sumpf soil. These three types of satisfactory soils have the following particle size distribution:

|  | Percent soil passing | | |
| --- | --- | --- | --- |
|  | Walnut creek | Turlock | Hans Sumpf |
| Screen sizes: | | | |
| 20 | 100 | 99.5 | 90.8 |
| 40 | 86.3 | 87.6 | 72.6 |
| 80 | 39.0 | 42.8 | 53.5 |
| 200 | 11.3 | 12.5 | 45.4 |

Other additives, such as Portland Cement, fly ash from power plants and the like, may also be used. When these other additives are used, they should constitute no more than about 30 percent of the aggregate materials, the balance being silty-clay soils.

ASPHALT TO SILTY-CLAY RATIO

The maintenance of the ratio of asphalt to silty-clay soil (including as part of the soil any other additives utilized but excluding any added prewetting water) within a certain range is critical to obtain satisfactory aggregate with the required strength and water resistance. To obtain the desired product, the ratio of asphalt to soil (on a weight basis) must be in the range of from 0.02 to 0.7:1.0, preferably 0.02 to 0.5:1.0. If any less asphalt is utilized, the product formed does not have the required strength and, if any more is utilized, the composition becomes tacky. The tumbling method of formation will not work with an overly sticky mixture and if the compression method is utilized, the resulting aggregate product sticks together making ultimate use difficult, if not impossible. When the ratio of asphalt to silty-clay soil is within the specified range, the aggregate has the required strength and water resistance as well as the required free-flow properties.

BAKING TEMPERATURES

When forming the asphalt soil bonds, it is also critical that a minimum temperature of about 250° F. be used to form the strong asphalt-aggregate required to give the needed compressive strength to the particles. Lower temperatures, as the following examples show, do not give the required compressive strength. Temperatures as high as 600° F. may be used, any higher temperatures resulting in degradation of the asphaltic material. A preferred temperature range is from about 300° to 450° F. A minimum baking time at temperature of 5 minutes is required and a minimum of 10 minutes is preferred. By "at temperature" is meant the aggregate has reached the temperature at which the baking step is carried out, i.e., for calculating the minimum time referred to above, the period of time during which water is being driven off and the temperature of the aggregate is rising to the baking temperature is not counted.

Example 1

250 grams of Walnut Creek clay soil was prewet with 25 grams of water with stirring and 12½ grams of an asphalt emulsion having the composition set forth in footnote 1 of Table 1. The mixture was blended for five minutes at 40 r.p.m. and the well-blended mixture was then rotated with a tumbling action in a container on a jar mill to form spherically shaped aggregate particles. After formation of the wet spherical particles, they were baked for 72 hours at 140° F. After cooling, the particles were tested for cohesive and compressive strength and for water resistance. The spherical particles were found to have high resistance to water, but did not have good compressive strength.

Examples 2–17

In a similar manner other soils were tested with varying quantities of an asphalt emulsion, various amounts of water, various mixing procedures, various curing procedures, and with varying degrees of success, all as shown in Table 1.

TABLE 1

| No. | Type of soil | Quantity of soil | Total Quantity of water added | Other prewetting material | Type and quantity of asphalt | Mixing procedure | Curing procedure | Compressive strength | Water resistance |
|---|---|---|---|---|---|---|---|---|---|
| 2 | Turlock | 250 | 35 | | 12.5 g. DM-1h¹ emulsion | 5 min. at 40 r.p.m. in 1-gal. container | 72 hours at 140° F | Poor | Poor. |
| 3 | Madison² sand | 250 | 65 | | do | do | do | Very poor | Do. |
| 4 | Walnut creek | 250 | 25 | | do | Combine water and soil, mix 5 min. at 40 r.p.m., add DM-1h 5 more min. at 40 r.p.m. all in 1-gal container. | 2 min. hot air gun at 250° F | Fair | Fair. |
| 5 | do | 250 | 25 | 25 g. 10% sodium silicate solution in water. | do | 5 min. at 40 r.p.m. in 1-gal. container | 10 min. of hot air at 300° F | do | Do. |
| 6 | do | 250 | 10 | 25 g. 10% sodium silicate solution in water. | do | Mix soil, sodium silicate solution and asphalt 10 min. at 33 r.p.m. Add the 10 g. water while mixing. | do | do | Do. |
| 7 | do | 250 | 10 | 25 g. 25% sodium silicate solution in water. | do | Mix soil, sodium silicate solution and asphalt 15 min. at 33 r.p.m. Add the water while mixing. | do | do | Do. |
| 8 | do | 250 | 30 | 20 g. 25% sodium silicate solution in water. | do | Mix soil, water and asphalt 15 min. at 33 r.p.m. Add the 20 g. sodium solution while mixing. | 10 min. of hot air at 400° F | Good | Good. |
| 9 | do | 250 | 27.5 | | 25 g. DM-1h¹ emulsion | 10 min. mixing at 33 r.p.m | 10 min. at 400° F | do | Do. |
| 10 | Madison² sand | 250 | 57.5 | | 12.5 g. DM-1h¹ emulsion | do | do | Poor | Poor. |
| 11 | Walnut creek | 250 | 25 | | do | 5 min. at 40 r.p.m | 15 r.p.m. while drying 10 min. at 400° F | Good | Good. |
| 12 | Hans Sumpf | 250 | 25 | | do | do | do | Very good | Very good. |
| 13 | Walnut creek | 250 | 30 | | do | 5 min. at 33 r.p.m | 15 r.p.m. while drying 20 min. at 480° F | Good | Good. |
| 14 | do | 250 | 35 | | do | 10 min. at 33 r.p.m | 1½ min. rotating at 15 r.p.m.—8½ min. stationary at 480° F. | do | Do. |
| 15 | do | 250 | 32 | | do | do | 15 r.p.m. while drying 75 min. at 480° F | do | Do. |
| 16 | do | 250 | 32 | | do | do | Dried 10 min. at 400° F | do | Do. |
| 17 | do | 250 | 32 | | do | do | Dried 15 min. at 600° F | do | Do. |

¹ 60% by weight of a 50/60 penetration asphalt, 2% by weight of Vinsol resin (a pinewood resin, product of Hercules, Inc.) emulsifier, 0.23 percent by weight sodium hydroxide, the balance being water.
² 100% passes a #20 screen size, 99.9% passes a #40 screen, 77.7% passes a #80 screen, and 6.6% passes a #200 mesh screen.

As can be seen from the above examples, a satisfactory synthetic aggregate can be prepared from silty-clay soils. All of the examples had the necessary free-flow properties to be utilized as an aggregate.

As will be evident to those skilled in the art, various modifications on this invention can be made or followed, in the light of the foregoing disclosure and discussion without departing from the spirit or scope of the disclosure. Therefore, the scope of the invention is intended to be limited only as indicated in the appended claims.

I claim:

1. A process for preparing synthetic aggregate consisting essentially of (1) prewetting 1 part of a silty-clay soil having a minimum of about 10 percent by weight silty-clay particles with from 5 to 20 percent by weight water based on the weight of said silty-clay soil, (2) combining from 0.02–0.7 part of an asphalt having a penetration in the range of from about 50 to about 150 at 77° F. and a softening point of from about 90–110° F. with said 1 part of said silty-clay soil, said asphalt being in the form of a cutback asphalt or an asphalt emulsion, (3) blending said asphalt and said silty-clay soil until homogeneous, (4) tumbling said mixture to form substantially spherical particles of from about one-quarter to about one inch in diameter, and (5) baking said spherical particles at a temperature of from about 250–600° F. for a minimum of 5 minutes at temperature.

2. The process of claim 1 wherein said asphalt is blended with said silty-clay soil as a cutback asphalt and said prewetting water is present in an amount of from about 5 to about 10 percent by weight based on the weight of said 1 part of said silty-clay soil.

3. The process of claim 2 wherein said silty-clay soil has a minimum of 5 percent by weight clay particles present.

4. The process of claim 3 wherein said clay particles are present in an amount of from 30–50 percent by weight.

5. The process of claim 4 wherein said asphalt is present in an amount of from 0.02–0.5 parts by weight.

6. The process of claim 5 wherein said baking occurs at a temperature of from about 300–450° F. for a minimum of 10 minutes at temperature.

7. The process of claim 1 wherein said asphalt is added to said silty-clay soil in the form of an emulsion.

8. The process of claim 7 wherein said silty-clay soil has a minimum of 5 percent by weight clay particles present.

9. The process of claim 8 wherein said clay particles are present in an amount of from 30–50 percent by weight.

10. The process of claim 9 wherein said asphalt is present in an amount of from 0.02–0.5 parts by weight.

11. The process of claim 10 wherein said baking occurs at a temperature of from about 300–450° F. for a minimum of 10 minutes at temperature.

(References on following page)

References Cited

UNITED STATES PATENTS

| | | | |
|---|---|---|---|
| 3,030,222 | 4/1962 | Eichenlaub | 106—286 X |
| 3,287,146 | 11/1966 | Rogers et al. | 106—281 |
| 3,548,046 | 12/1970 | Savage | 264—118 |
| 3,562,373 | 2/1971 | Logrippo | 264—118 |
| 2,572,068 | 10/1951 | Sommer | 106—281 X |
| 3,352,702 | 11/1967 | Leitner et al. | 106—281 |
| 2,009,886 | 7/1935 | Heghinian | 106—281 R |
| 2,917,395 | 12/1959 | Csanyi | 106—122 R |

OTHER REFERENCES

Browning, Jon E., Agglomeration: Growing Larger in Applications and Technology, in Chemical Engineering, TN1 M45, pp. 149, 150, 154–156, 161–164, 168 relied on.

JOAN B. EVANS, Primary Examiner

U.S. Cl. X.R.

94—20, 23; 106—281, 283; 117—100, 168; 241—3; 264—117